US010184563B2

(12) United States Patent
Koop et al.

(10) Patent No.: US 10,184,563 B2
(45) Date of Patent: *Jan. 22, 2019

(54) SINGLE SEAL RING STUFFING BOX

(71) Applicant: Howden Thomassen Compressors BV, Rheden (NL)

(72) Inventors: Laurentius Gerardus Maria Koop, Westervoort (NL); Petrus Nicolaas Duineveld, Angerlo (NL)

(73) Assignee: Howden Thomassen Compressors BV (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/826,826

(22) Filed: Nov. 30, 2017

(65) Prior Publication Data

US 2018/0080561 A1 Mar. 22, 2018

Related U.S. Application Data

(63) Continuation of application No. 15/101,249, filed as application No. PCT/EP2013/076141 on Dec. 10, 2013, now Pat. No. 9,856,983.

(51) Int. Cl.
*F16J 15/16* (2006.01)
*F16J 15/26* (2006.01)
*F04B 39/04* (2006.01)

(52) U.S. Cl.
CPC .............. *F16J 15/26* (2013.01); *F04B 39/041* (2013.01)

(58) Field of Classification Search
CPC ........ F04B 39/041; F16J 15/18; F16J 15/181; F16J 15/184; F16J 15/186; F16J 15/20
See application file for complete search history.

(56) References Cited

U.S. PATENT DOCUMENTS 3,271,037 A 9/1966 Hammond
3,490,774 A 1/1970 Henry et al.
(Continued)

FOREIGN PATENT DOCUMENTS

DE 4201246 A1 7/1993
DE 19506083 A1 7/1995
(Continued)

OTHER PUBLICATIONS

Decision of Grant for Russian counterpart application 2016127557/06(043200) dated Sep. 4, 2017.
(Continued)

Primary Examiner — Gilbert Y Lee
(74) Attorney, Agent, or Firm — Edell, Shapiro & Finnan, LLC

(57) ABSTRACT

A seal arrangement for use in a reciprocating piston compressor includes first and second seal rings engaged along respective side surfaces, and first and second cover rings disposed around the first and second seal rings such that the outside diameters of the first and second seal rings engage the inside diameters of the first and second cover rings, respectively. A support ring is engaged with the first seal ring and the first cover ring. A backup ring is engaged with the second seal ring and the second cover ring. In some embodiments, the first seal ring has a width that is smaller than a width of the second seal ring. In other embodiments the second seal ring has a circumferential groove formed on an inside surface thereof, the groove disposed directly adjacent the first seal ring. In further embodiments, the seal rings are formed of PEEK with a nano-material additive.

20 Claims, 9 Drawing Sheets

(56) References Cited

U.S. PATENT DOCUMENTS

| | | | |
|---|---|---|---|
| 3,658,348 | A | 4/1972 | Nink |
| 3,711,104 | A | 1/1973 | Henry |
| 5,014,999 | A | 5/1991 | Makhobey |
| 5,217,232 | A | 6/1993 | Makhobey |
| 8,985,588 | B2 * | 3/2015 | Feistel ............... F16J 15/24 277/489 |
| 2013/0154197 | A1 | 6/2013 | Feistel |

FOREIGN PATENT DOCUMENTS

| | | |
|---|---|---|
| DE | 19506683 A1 | 9/1996 |
| EP | 1070928 A1 | 1/2001 |
| GB | 599983 A | 3/1948 |
| JP | S60-123459 | 8/1985 |
| JP | 11-248392 A | 9/1999 |
| JP | 2000346583 A | 12/2000 |
| JP | 200493036 A | 3/2004 |
| JP | 2008106823 A | 5/2008 |
| JP | 2009503421 | 1/2009 |
| JP | 2012526262 A | 10/2012 |
| RU | 2016308 C1 | 7/1994 |
| WO | 2007012874 A1 | 2/2007 |
| WO | 2010129092 A1 | 11/2010 |

OTHER PUBLICATIONS

Canadian Office Action from corresponding Canadian Application No. 2,931,699 dated Feb. 17, 2017.

Japanese Office Action from corresponding Japanese Application 2016-543455 dated Feb. 7, 2017.

International Search Report and Written Opinion dated Sep. 16, 2014 for PCT application PCT/EP2013/076141 filed Dec. 10, 2013.

Office Action from Chinese Patent Office for Chinese Patent Application 201380081494.4 dated Apr. 2, 2018.

KIPO's Notice of Preliminary Rejection for Korean Patent Application No. 10-2016-7015049 with English translation dated Dec. 6, 2017.

* cited by examiner (PRESSURE FROM THIS SIDE)

SINGLE SEAL RING STUFFING BOX

CROSS-REFERENCE TO RELATED APPLICATIONS

This application is a continuation of U.S. Non-Provisional patent application Ser. No. 15/101,249, entitled "Single Seal Ring Stuffing Box," filed Jun. 2, 2016, which is the National Stage of International Application No. PCT/US2013/076141, filed on Dec. 10, 2013, the disclosures of which are incorporated herein by reference in their entirety for all purposes.

FIELD OF THE INVENTION

Embodiments of the invention generally relate to sealing arrangements for gas compressors, and more particularly to a stuffing box seal arrangement for a reciprocating gas compressor.

DISCUSSION OF RELATED ART

A stuffing box is a sealing assembly that seals the area around the piston rod in a reciprocating compressor to minimize leakage of process gas from the compressor's pressurized cylinder to the atmosphere and/or the compressor's internal spaces. Due to the high speed reciprocating motion of the piston rod, internal components of the stuffing box can experience high friction wear over time. For example, the individual sealing elements used to seal against the piston rod surface can suffer from a short working life due to the frictional heat and frictional wear generated between the outer surface of the piston rod and the inner seal surface. As will be appreciated, the short life of these sealing elements results in relatively short maintenance intervals for the associated compressor. The more frequently the compressor must be taken off line to replace the sealing elements, the less efficient is the operation of the overall system.

Prior attempts to address sealing element wear in reciprocating compressors have been aimed at adjusting the materials used to form the sealing elements. For example, seals have been manufactured from Polytetrafluorethylene (PTFE) or Polyether ether-ketone (PEEK) materials combined with fillers such as carbon, graphite, Molybdenum disulfide ($MoS_2$) glass fiber, and the like. Other attempts have involved the use of multiple sealing rings and pressure breaker rings in the stuffing box and/or applying pressure compensation techniques to limit wear.

Still, such attempts have failed to result in a seal with a desired long life that can provide suitably increased maintenance intervals. Thus, a need exists for an improved stuffing box arrangement for use with reciprocating compressors.

SUMMARY OF THE DISCLOSURE

To address the above deficiencies in the prior art, a stuffing box sealing arrangement is disclosed that is more resistant to operational wear than currently available sealing assemblies, particularly in high pressure and non-lubricated conditions.

The disclosed design includes two parts. First, pressure compensation is employed to reduce the radial force on the seal rings. Second, novel wear resistant seal ring linings are provided. Lower radial force on the seal rings (due to pressure compensation) directly leads to less friction and, hence, to less wear and heat generation. In addition the improved seal ring lining design decreases gas leakage due to the high conformability of the thin (in radial direction) seal rings.

In some embodiments the material used for the seal linings has a reduced friction coefficient which reduces friction wear even further. The seal material can also withstand high internal loads caused by pressure compensation at high pressures (e.g. >100 bar). Further, the material has a high resistance to contamination by particles Conventional stuffing boxes generally consist of multiple pockets containing multiple rings and frequently demands lubrication to reduce wear. The disclosed seal ring design efficiently seals off piston rods in non-lubricated service and/or for high pressure conditions (>100 bar). This results in a compact design of the overall stuffing box.

In addition, the disclosed design may include a pressure compensation feature that includes grooves in the individual sealing rings. These grooves may be connected to the high pressure side of the stuffing box through a split in the support ring portion of the sealing ring. A cover seal ring may comprise conventional PTFE material, while the lining seal rings may be made from an improved friction resistant material comprising PEEK with nano-material additives for reduced friction and increased thermal conductivity. These lining seal rings have a high strength so that the ring set can be used at very high pressures. Due to this high mechanical strength, of the lining seal rings, the width of the rings can be small which, in combination with the pressure compensation feature, can result in low frictional power during operation. The disclosed use of lining seal rings in combination with one or more cover seal rings is an improvement over prior designs. While prior attempted solutions have employed pressure compensation, such attempts enabled only partial pressure compensation and used multiple split rings without lining seal rings.

The disclosed combination of pressure compensation and low-friction lining seal rings can result in a sealing assembly that has a single ring configuration in lieu of prior multiple seal ring sets. The resulting stuffing box may have improved life compared to conventional seals and may be able to operate in high pressure and non-lubricated circumstances. The disclosed stuffing box will have a long life time, compact design and excellent performance under difficult circumstances, with less total seal material required. The disclosed design will ultimately lead to longer maintenance intervals for the compressors in which the sealing arrangement is employed.

A sealing ring is disclosed for use in a stuffing box of a reciprocating compressor. The sealing ring may include first and second seal rings engaged along respective side surfaces, and first and second cover rings disposed around the first and second seal rings such that the outside diameters of the first and second seal rings engage the inside diameters of the first and second cover rings, respectively. A support ring may be engaged with the first seal ring and the first cover ring, while a backup ring may be engaged with the second seal ring and the second cover ring. In some embodiments, the first seal ring has a width that is smaller than a width of the second seal ring. In other embodiments, the second seal ring has a circumferential groove formed on an inside surface thereof, the groove disposed directly adjacent the first seal ring. The first and second seal rings may be made from PEEK with a nano-material additive.

A sealing ring is disclosed for use in a stuffing box of a reciprocating compressor. The sealing ring may include first and second seal rings engaged with each other, and first and second cover rings disposed around the first and second seal rings. A support ring may be engaged with the first seal ring and the first cover ring, and a backup ring may be engaged with the second seal ring and the second cover ring. In some embodiments, the first seal ring has a width that is smaller than a width of the second seal ring. In other embodiments, the second seal ring has a groove formed on an inside surface thereof. The first and second seal rings may be made from PEEK with a nano-material additive.

BRIEF DESCRIPTION OF THE DRAWINGS

The accompanying drawings illustrate preferred embodiments of the disclosed method so far devised for the practical application of the principles thereof, and in which.

DESCRIPTION OF EMBODIMENTS

An improved sealing arrangement is disclosed for use in reciprocating piston compressors. The improved sealing arrangement includes a multi-piece seal ring configured to undergo reduced wear in operation. By reducing wear, the disclosed multi-piece seal ring design enables the associated reciprocating compressor to operate for longer periods between component refurbishment as compared to prior designs. The disclosed design also accommodates a wider range of differential operating pressures (suction vs. discharge) in non-lubricated applications as compared to prior devices.

Figure 1:
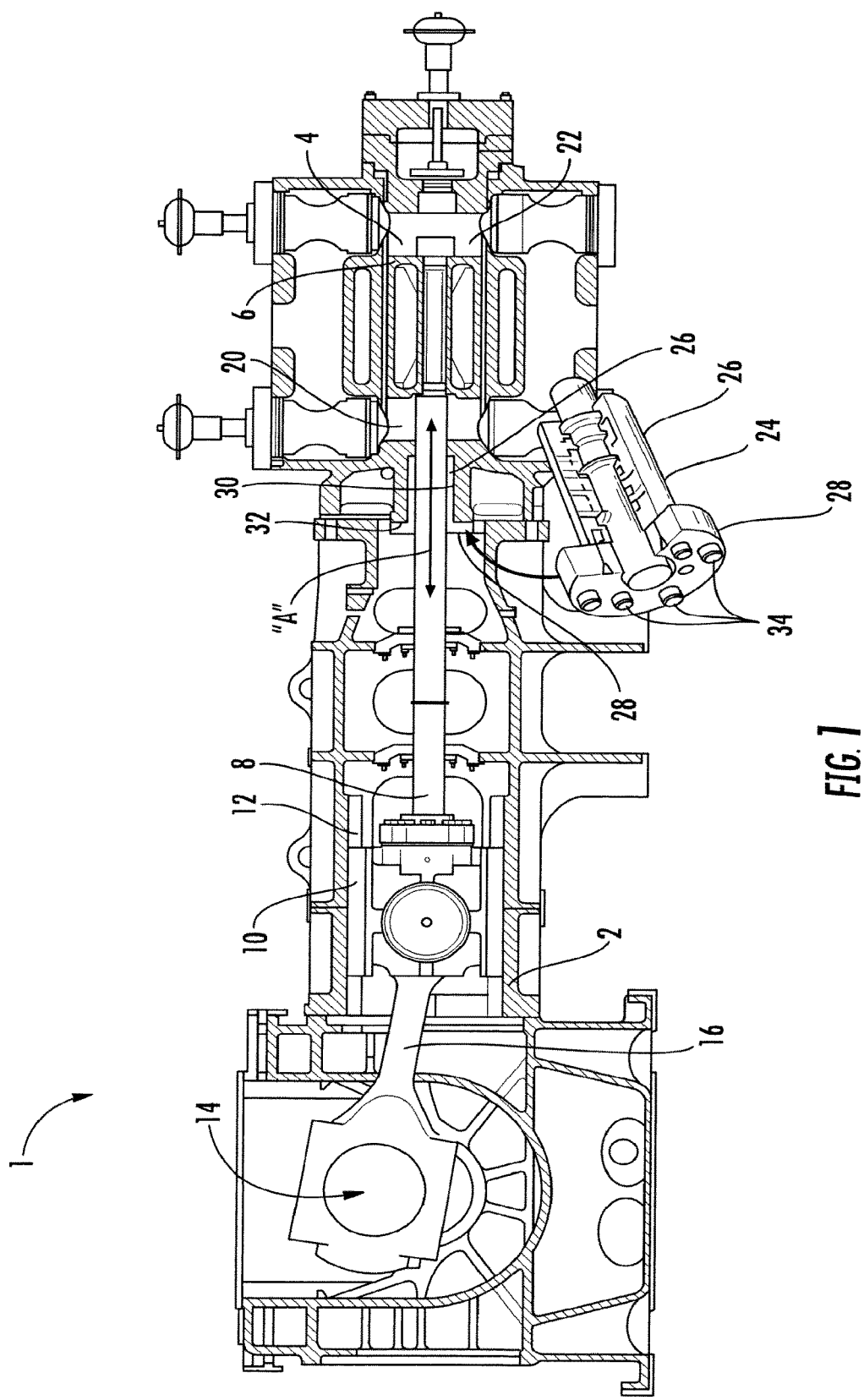
FIG. 1 is a cross-section view of an exemplary reciprocating compressor.

Referring to FIG. 1, a cross-section view of an exemplary horizontal piston compressor 1 is shown. The compressor may include a frame 2, in which a cylinder 4 is disposed. The cylinder 4 contains a piston 6, which reciprocable in the cylinder 4. A piston rod 8 is fixed to the piston 6 at one end, and a crosshead 10 at the opposite end. The crosshead 10 is guided reciprocably in a horizontal straight line in the frame 2 of the compressor by means of a crosshead guide 12. The linear movement of the crosshead 10 is produced by a crank 14 which is coupled to the crosshead 10 via a connecting rod 16. The rotary movement of the crank 14 is transmitted to the crosshead 10 by the connecting rod 16.

The illustrated compressor is of the double acting type, in which first and second compression chambers 20 and 22 are formed in the cylinder 4 on either side of the piston 6. Each of the first and second compression chambers 20, 22 is provided with appropriate suction and discharge valves such that movement of the piston 6 in the direction of the crank mechanism (i.e., to the left in FIG. 1), gas at a suction pressure is introduced into the second compression chamber 22 via the associated suction valve. At the same time the gas present in the first compression chamber 20 is compressed and discharged at a discharge pressure via the associated discharge valve. Although not shown, a source of gas is coupled to the inlet valves, while the outlet valves may be coupled to appropriate discharge piping.

Figure 2:
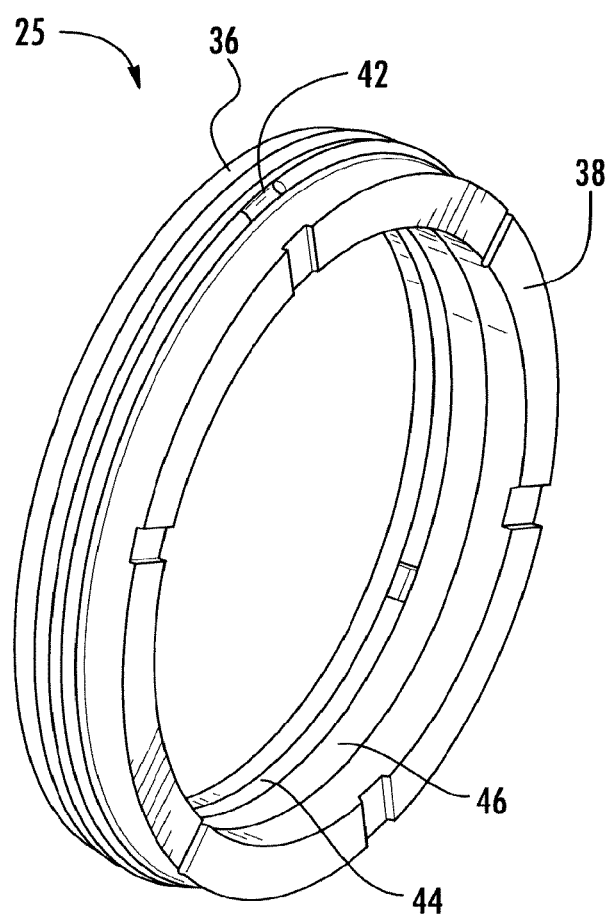
FIG. 2 is an isometric view of an exemplary stuffing box seal ring assembly for use in the piston compressor of FIG. 1.
Figure 7A:
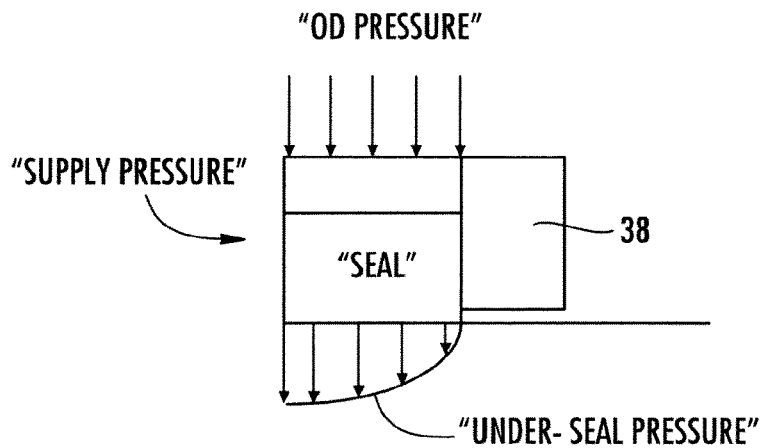
FIGS. 7A-7C show exemplary pressure distributions between a seal ring and a piston rod for various seal configurations.
Figure 7B:
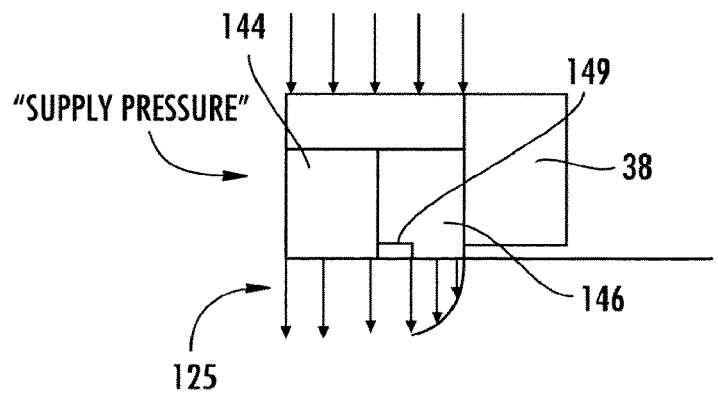
Figure 7C:
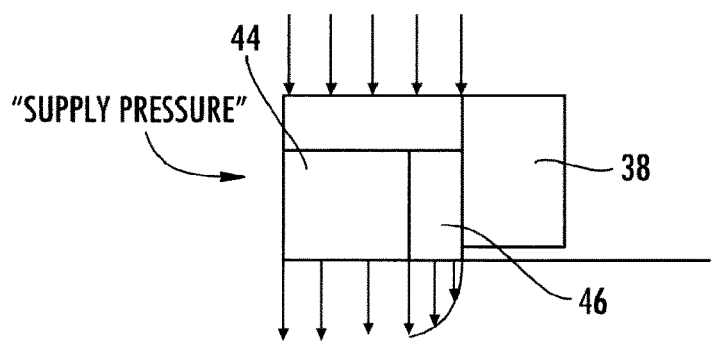

In order to seal the first compression chamber 20 from the remainder of the compressor internals, a stuffing box 24 (see FIG. 7) is disposed about the piston rod 6 directly adjacent to the first compression chamber. As will be explained in greater detail later, the stuffing box 24 may include, inter alia, a plurality of sealing rings 25 (see FIG. 2) configured to prevent leakage of compressed gas from the first compression chamber 22. In the illustrated embodiment, the stuffing box 24 comprises a cylindrical body portion 26 and a connecting flange portion 28. The cylindrical body portion 26 is slidably received within a correspondingly sized cylindrical recess 30 in the frame 2, while the connecting flange portion 28 abuts a sealing face 32 of the frame. The connecting flange portion 28 can be fixed to the frame 2 via a plurality of fasteners 34, which in the illustrated embodiment comprise bolts. Although not shown, an appropriate gasket or other seal material can be disposed between the connecting flange portion 28 and the sealing face 32 of the flange.

Thus arranged, during operation the piston rod 6 undergoes reciprocating motion as indicated by double-ended arrow "A," such that the outer surface of the piston rod 6 slides on the inner surface of the sealing rings 25. The arrangement of the sealing rings within the stuffing box 24 thereby prevents compressed gas in the first compression chamber 20 from passing through the stuffing box.

FIGS. 2-4B show an exemplary sealing ring 25 for use in the disclosed stuffing box 24 for sealing against the piston rod 6. As will be described, the sealing ring 25 may be composed of a plurality of individual elements which together act to provide desired sealing characteristics during operation of the associated compressor 1. Thus, the illustrated sealing ring 25 includes a back-up ring 36 and a shim 38 which together sandwich first and second cover rings 40, 42 and first and second seal rings 44, 46.

The shim 38 may be positioned on the side of the sealing set 25 subject to the high pressure of the first compression chamber 20. In operation the shim 38 serves to keep the first and second seal rings 44, 46 and first and second cover rings 40, 42 in position relative to each other, and to prevent the first and second seal rings from slipping between the piston rod 6 and the stuffing box chamber. The shim ring 38 may be a generally cylindrical flat ring member having an inside diameter ID1, and outside diameter OD1, first and second opposing faces 38a, b and a width W1. In some embodiments the shim ring 38 may be made from PTFE so as to fill in any gaps in the portion of the stuffing box chamber that the backup ring seals against. The shim ring 38 may be positioned on the side of the sealing set 25 that faces the first compression chamber 20, and thus, it may be subjected to the pressure of the first compression chamber during operation. In some embodiments the shim ring 38 is made from PTFE.

The back-up ring 36 may likewise be a generally cylindrical ring flat member having an inside diameter ID2, an outside diameter OD2, first and second opposing faces 36a, b and a width W2. In some embodiments the back-up ring 36 is made from metal such as bronze or Cast Iron, to prevent extrusion of the first and second seal rings 44, 46 when the sealing set 25 is under pressure.

The first and second cover rings 40, 42 may be cylindrical ring members each having an inside diameter ID3, ID4 an outside diameter OD3, OD4, first and second opposing faces 40a, b, 42a, b and a width W3, W4. As can be seen, the first cover ring 40 can have a width W3 that is smaller than the width W4 of the second cover ring 42. This relative width arrangement is part of the pressure compensation function of the sealing ring 25 design, as will be described in greater detail later. The first and second cover rings 40, 42 can include respective first and second outer circumferential recesses 41, 43 configured to receive respective first and second spring elements 45, 47 for maintaining the first and second cover rings 40, 42 engaged with the first and second sealing rings 44, 46.

The first and second seal rings 44, 46 may be cylindrical ring members each having an inside diameter ID5, ID6, an outside diameter OD5, OD6, first and second opposing faces 44a, b, 46a, b and a width W5, W6. As can be seen, the outside diameter OD5, OD6 of each of the first and second seal rings 44, 46 is smaller than the inside diameter ID3, ID4 of the first and second cover rings 40, 42 so that the first and second seal rings can be enclosed by the first and second cover rings with the sealing ring 25 is assembled.

Figure 4A:
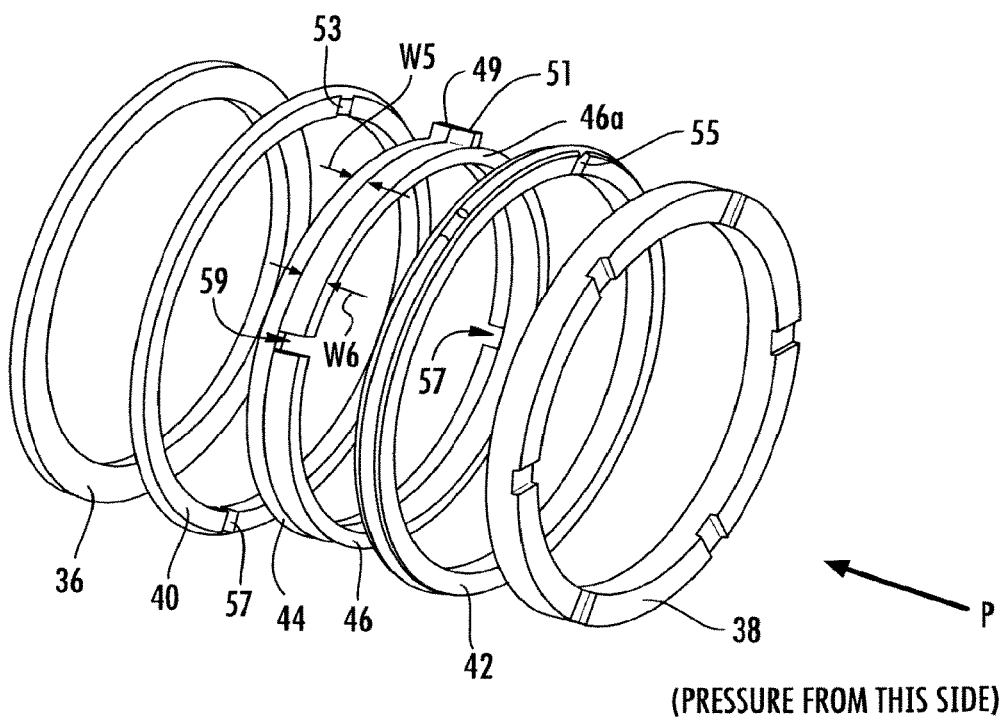
FIGS. 4A and 4B are exploded and cross-section views of the seal ring assembly of FIG. 2.

As can be seen in FIG. 4A, the first and second seal rings 44, 46 may further each include a radially extending tab 49, 51 configured to fit within a respective radial recess 53, 55 formed in the associated cover rings 40, 42 to prevent relative rotation of the first and second seal rings during operation.

In the illustrated embodiment, the first and second seal rings 44, 46 have inside diameters ID5, ID6 that are substantially equal and outside diameters OD5, OD6 that are substantially equal. The second seal ring 46, however, has a width W6 that is greater than the width W5 of the first seal ring 44. In some embodiments, the widths W5, W6 of the first and second seal rings 44, 46 may correspond to the widths W3, W4 of their respective cover ring 40, 42.

The first and second seal rings 44, 46 may further be "split" rings in that they may each have an opening 57, 59 that allows them to expand or contract slightly to accommodate small differences in piston rod diameter, thus ensuring constant contact with the piston rod 6. As can be seen, the openings 57, 59 in the first and second seal rings 44, 46 are offset from each other so as not to constitute a leak path through the sealing ring 25. In the illustrated embodiment the openings 57, 59 are offset by about 180-degrees, though this is not critical and offsets of other magnitudes can be used.

Figure 3A:
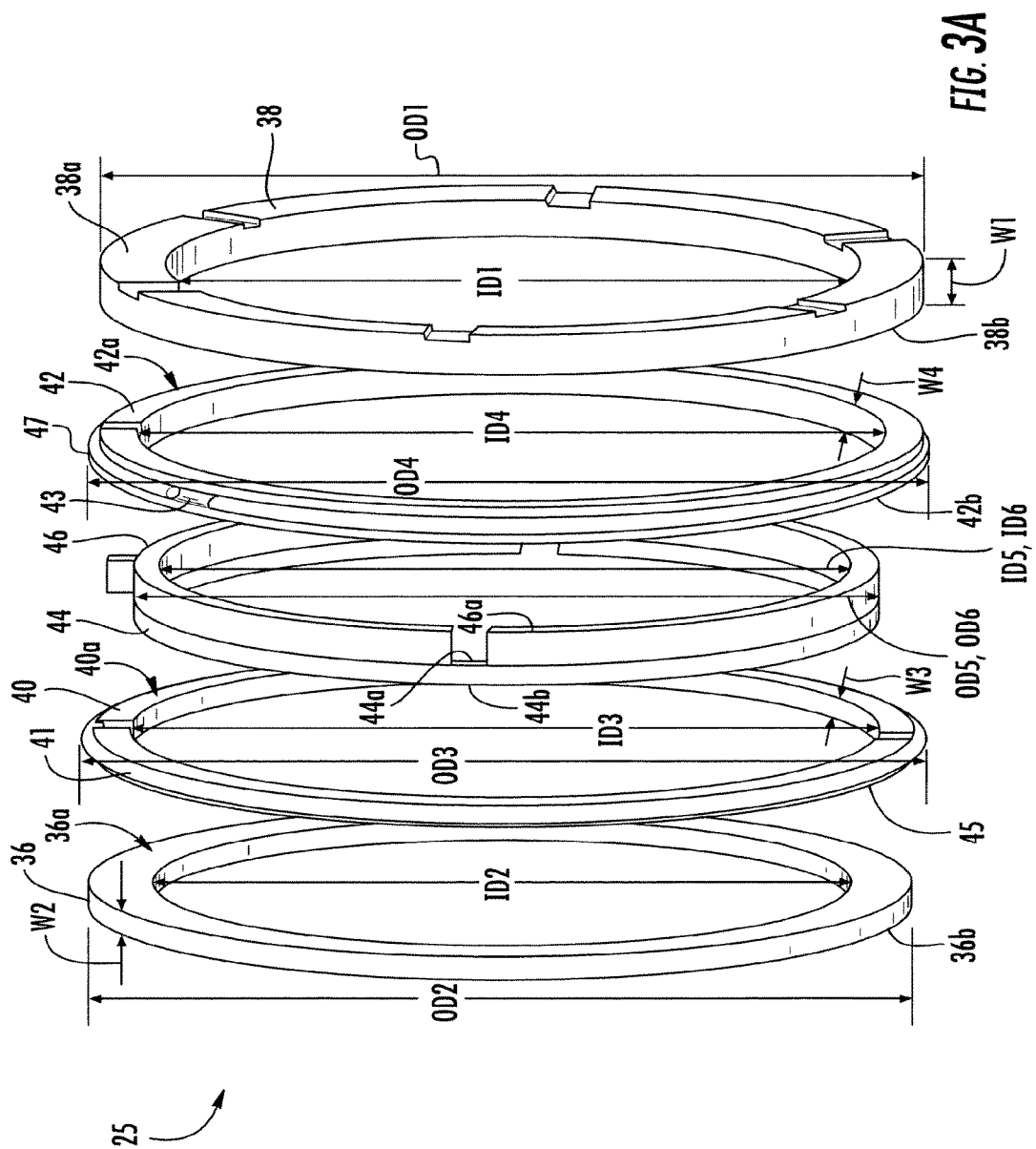
FIG. 3A is an exploded view of the seal ring assembly of FIG. 2.
Figure 3B:
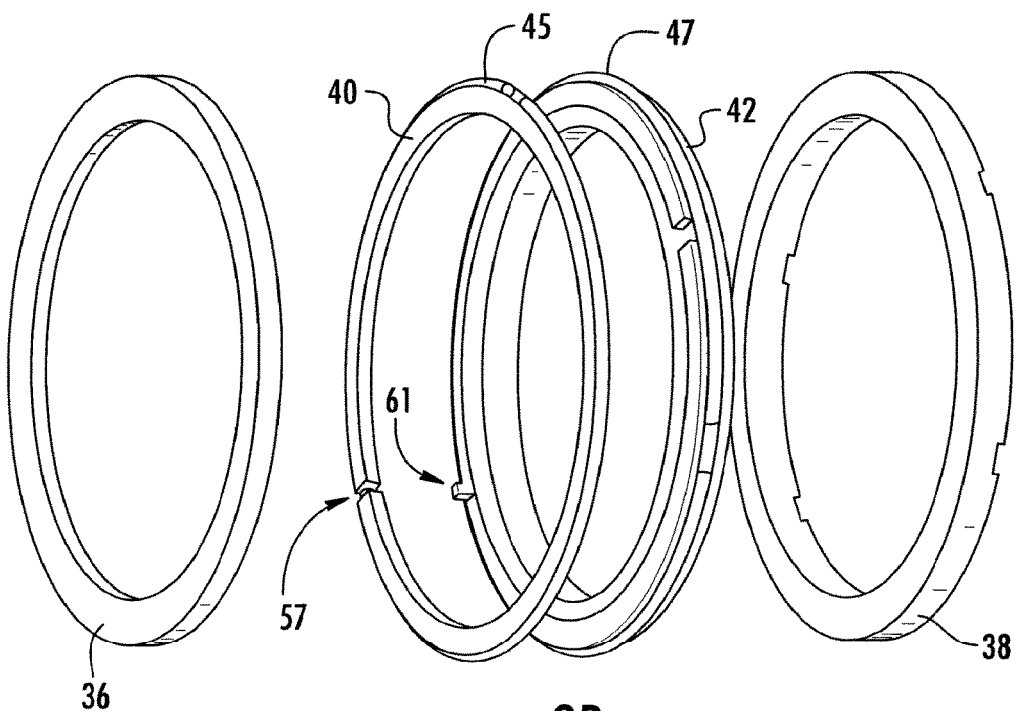
FIG. 3B is a reverse exploded view of the seal ring assembly of FIG. 2.

The first and second cover rings 40, 42 may function as "split" rings, owing to the radial recesses 53, 55 formed therein. These recesses can allow the first and second cover rings 40, 42 to expand or contract slightly to match any small adjustments in the outside diameter OD5, OD6 of the associated first or second seal ring 44, 46 during operation. In the illustrated embodiment, the first cover ring 40 includes a second recess 57 spaced about 180-degrees apart from the recess 53. Referring to FIG. 3B, this second recess 57 receives a projection 61 formed on the second cover ring 42. This inter-fitting prevents rotation of the rings with respect to each other. It will be appreciated that this projection/recess arrangement is not critical, and that other features may be used to prevent relative rotation between the elements.

Figure 4B:
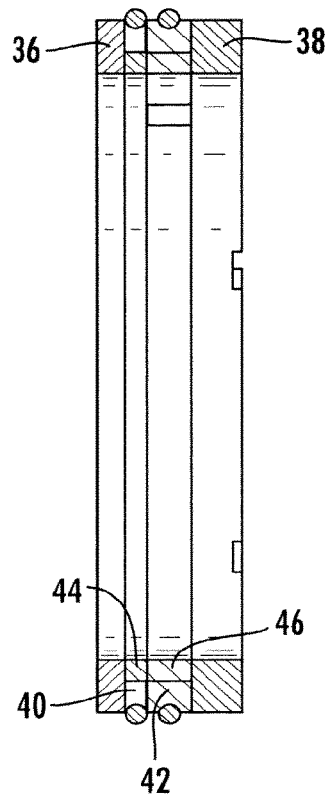

The close inter-fitting arrangement of the elements of the seal ring set 25 can be seen in FIG. 4B, in which the first and second seal rings 44, 46 are covered about their outside diameters OD5, OD6 by respective inside diameters ID3, ID4 of the first and second cover rings 40, 42. This group of elements is then sandwiched between the support ring 36 and backup ring 38. The axial clearance of the complete seal ring set 25 in the chamber may be adjusted by adjusting the width W1 of the shim ring 38. The clearance between individual elements of the seal ring set 25 is small enough to maintain the elements of the seal ring set together, while being large enough to accommodate the thermal expansion of the elements during operation. The first and second spring elements 45, 47 maintain the first and second cover rings 40, 42 together and engaged around the first and second seal rings 44, 46.

Figure 5A:
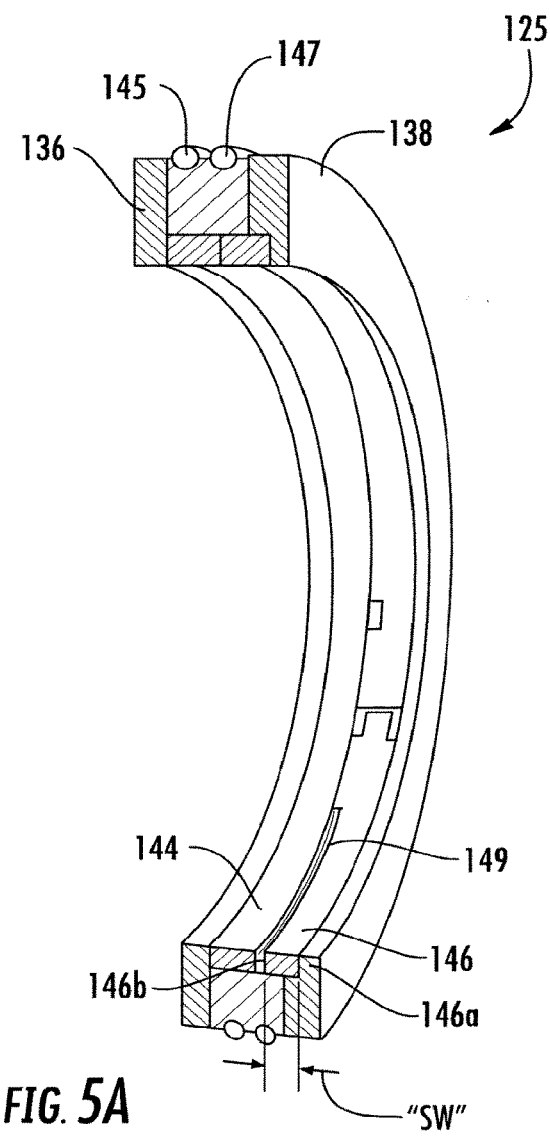
FIG. 5A is a cutaway view of an alternative stuffing box seal ring assembly for use in the piston compressor of FIG. 1.

FIG. 5A shows an alternative construction of a sealing set 125 that includes a shim 136, backup ring 138, first and second seal rings 144, 146, and a single cover seal ring 140. The cover seal ring 140 includes circumferential recesses for receiving first and second sealing elements spring elements 145, 147 that maintaining the cover ring 140 engaged with the first and second sealing rings 144, 146.

The dimensions and operational characteristics of the sealing set 125 of this embodiment may be similar to or the same as those of the sealing ring 25 described in relation to FIGS. 2-4B. For example, the support ring, backup ring, cover ring and first and second sealing rings may be made from the same materials as described in relation to the prior embodiment. In addition, the relative dimensions of the elements may be similar to those described in relation to the prior embodiment.

Figure 5B:
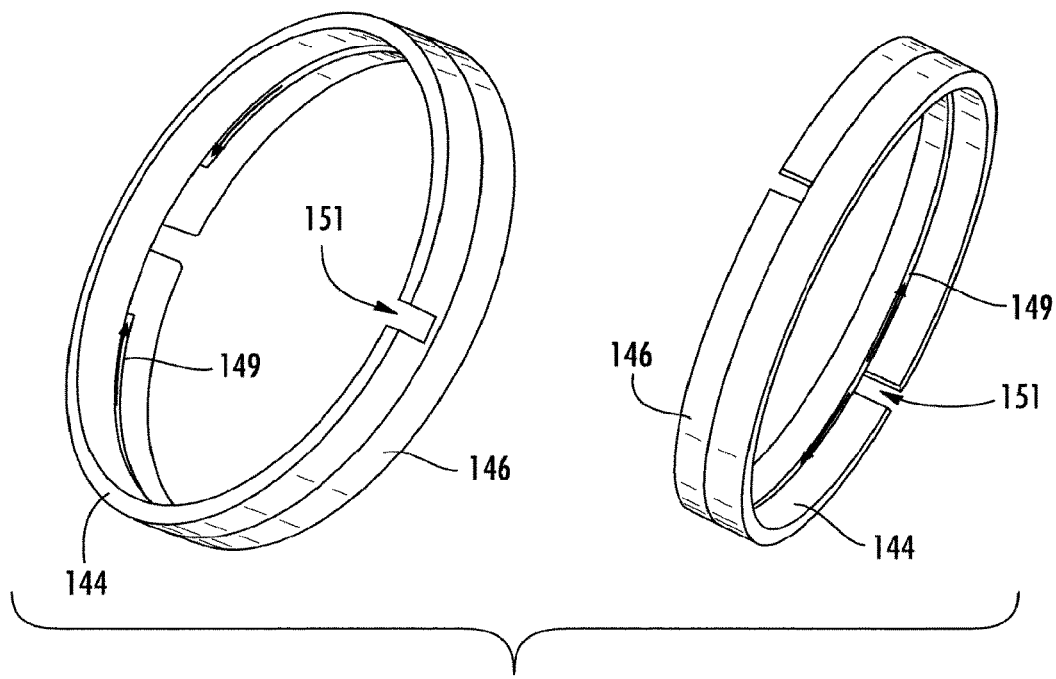
FIG. 5B is an isometric view of first and second sealing rings of the sealing ring assembly of FIG. 5A.

As can be seen, with this embodiment the widths W5, W6 of the first and second sealing rings 144, 146 are substantially the same. The second sealing ring 146, however, includes a circumferential groove 149 disposed adjacent to the first sealing ring 144. This circumferential groove runs along a portion of the circumference of the second sealing ring 146 and reduces the thickness of the second sealing ring 146 along a portion of the width W6. As will be described in greater detail later, a pressure compensation feature is provided via the groove 149. Specifically, the groove 149 may be coupled to high pressure gas via an opening 151 in the first sealing ring 144 (see FIG. 5B).

Figure 6:
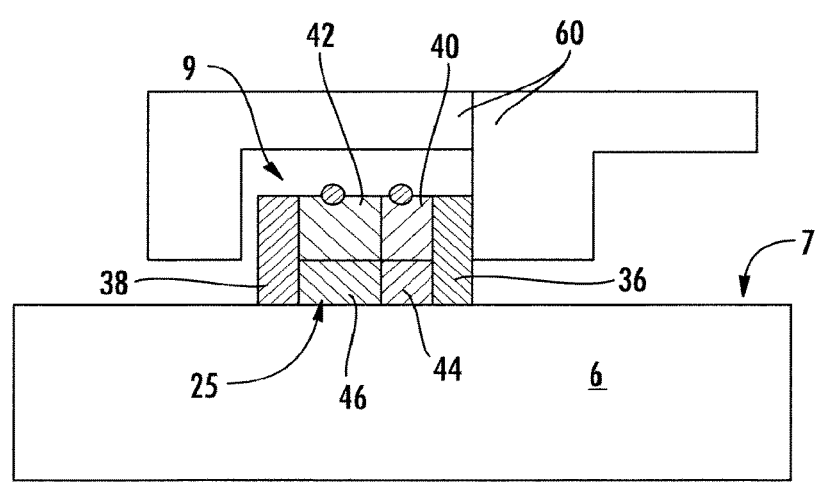
FIG. 6 is a cross-section view of the seal ring assembly of FIG. 2 disposed in an exemplary stuffing box.

Referring now to FIG. 6, a cross-sectional view of the disclosed sealing set 25 disposed in relation to an exemplary piston rod 6 and stuffing box chamber portion 60 is shown. The inside diameters ID5, ID6 of the first and second seals 40, 42 are engaged with the outer surface 7 of the piston rod 6. A recess 9 is shown between the support ring 36, backup ring 38 and first and second cover rings 40, 42 and the stuffing box chamber portion 60. In operation, this recess 9 may be pressurized with gas. The shim ring 5 is on the high pressure side, and back-up ring 6 on the low pressure side. There is a clearance between the shim 5 and the casing. As previously noted, the sealing rings 25, 125 include a pressure compensation feature for reducing the differential pressure across the first and second seal rings 44, 46; 144, 146. By reducing the differential pressure across the first and second seal rings 44, 46, frictional power during operation is decreased, resulting in less heat generation and wear in operation.

As noted in relation to the embodiment of the sealing ring 125 of FIG. 5A, a partial circumferential groove 149 is provided in the second seal ring 146. The groove 149 can be pressurized or filled with gas from the high pressure side (i.e., the side adjacent to the first compression chamber 20), so the effective sealing area between the sealing ring 125 and the piston 6 is only the very small section of the second seal ring 146 from the groove 149 to the backup ring 138. Thus, with the disclosed design, a small width "SW" of the sealing ring 146 is sealing against the piston rod 6, and pressure compensation is provided between the outer side 146a and the inner side 146b of the second seal ring 146. Pressure on the outside diameter OD6 and the inside diameter ID6 is equal, since the groove 149 is pressurized.

As will be appreciated, the net sealing force is the pressure on the outer diameter (OD Pressure) of a seal times the supply pressure minus the average pressure under the seal. (See FIG. 7A.) With the seal arrangement of FIG. 5, which includes a gap 149 between first and second seal rings 144, 146 the pressure gradient in the gap 149 between the sealing ring 125 and the piston rod 6 follows a hyperbolic function (see FIG. 7B). The net radial force on the sealing ring 125 is caused by the pressure force on the outer diameter of the sealing ring minus the average pressure force under the sealing ring. Thus, the higher the average pressure under the sealing ring, the lower the radial force.

When a groove 149 is provided in the second seal ring 146, the pressure under the seal remains at a constant high value up to the end of the groove. In this way the radial force is partly compensated and friction is reduced. The gas pressure enters the groove 149 via an opening 151 (FIG. 5B) of the first sealing ring 144. As will be appreciated, however, the groove 149 can be vulnerable to mechanical damage. It can also become filled with debris during operation.

The embodiment described in relation to FIGS. 2-4B illustrate a pressure compensation feature that does not include a groove in either sealing ring. The inventors have found that varying the widths of the first and second sealing rings 44, 46 can result in a desired pressure compensation result without the use of a groove. Thus, with the embodiment of FIGS. 2-4B, a relatively narrow first seal ring 44, and a relatively wide second seal ring 46 is used. The relatively wide second seal ring 46 has a width equal to the width of the ring of the prior embodiment including the groove (see FIG. 7C). As a result, the pressure compensation effect is the same as with the grooved ring set.

In addition to the pressure compensation feature, the material of the first and second seal rings 44, 46 may be selected to have a small friction coefficient, reducing friction even further. In one embodiment, the seal rings 44, 46 may be made from out of a modified PEEK material sold under the trade name LUVOCOM 1105-8160, Lehmann &Voss & Co. Alsterufer 19, D-20354 Hamburg, Germany. This material is capable of withstanding high internal loads caused by pressure compensation at high pressures. Additionally, this material has a high resistance to contamination by (water) particles is high due to its high hardness, which allows the seal rings to be machined to have very smooth surfaces.

Figure 8:
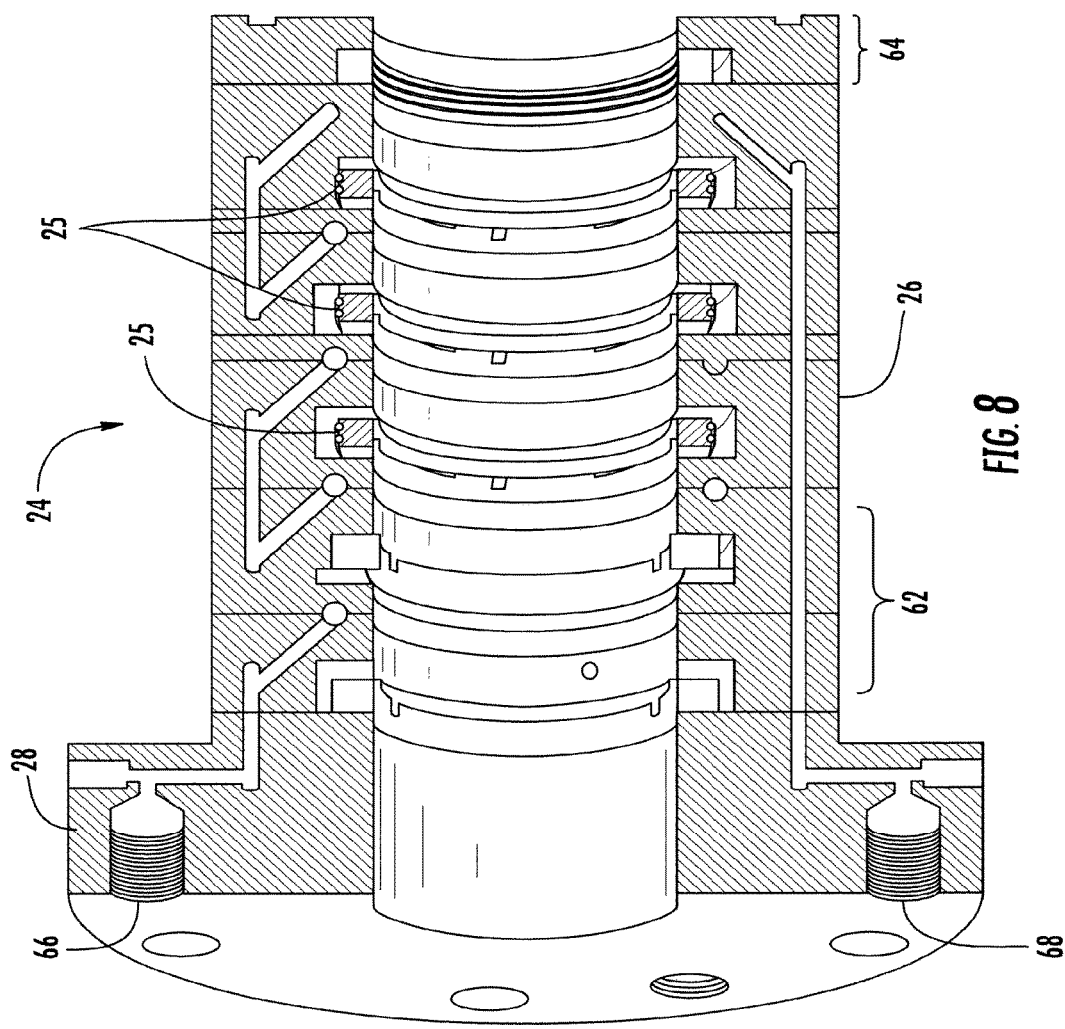
FIG. 8 is an exemplary stuffing box sealing arrangement including a plurality of seal ring assemblies of FIG. 2.

FIG. 8 illustrates an exemplary stuffingbox case 24 that includes the disclosed sealing ring set 25. As can be seen, the stuffingbox case 24 includes a vent ring set 62, three sets of sealing rings 25, and one pressure breaker set 64. Gas coupling connections 66, 68 are disposed within the stuffingbox case 24 and may be routed to provide gas to selected locations adjacent one or more of the vent ring set 62, the sealing rings 25 and the pressure breaker set 64.

Figure 9:
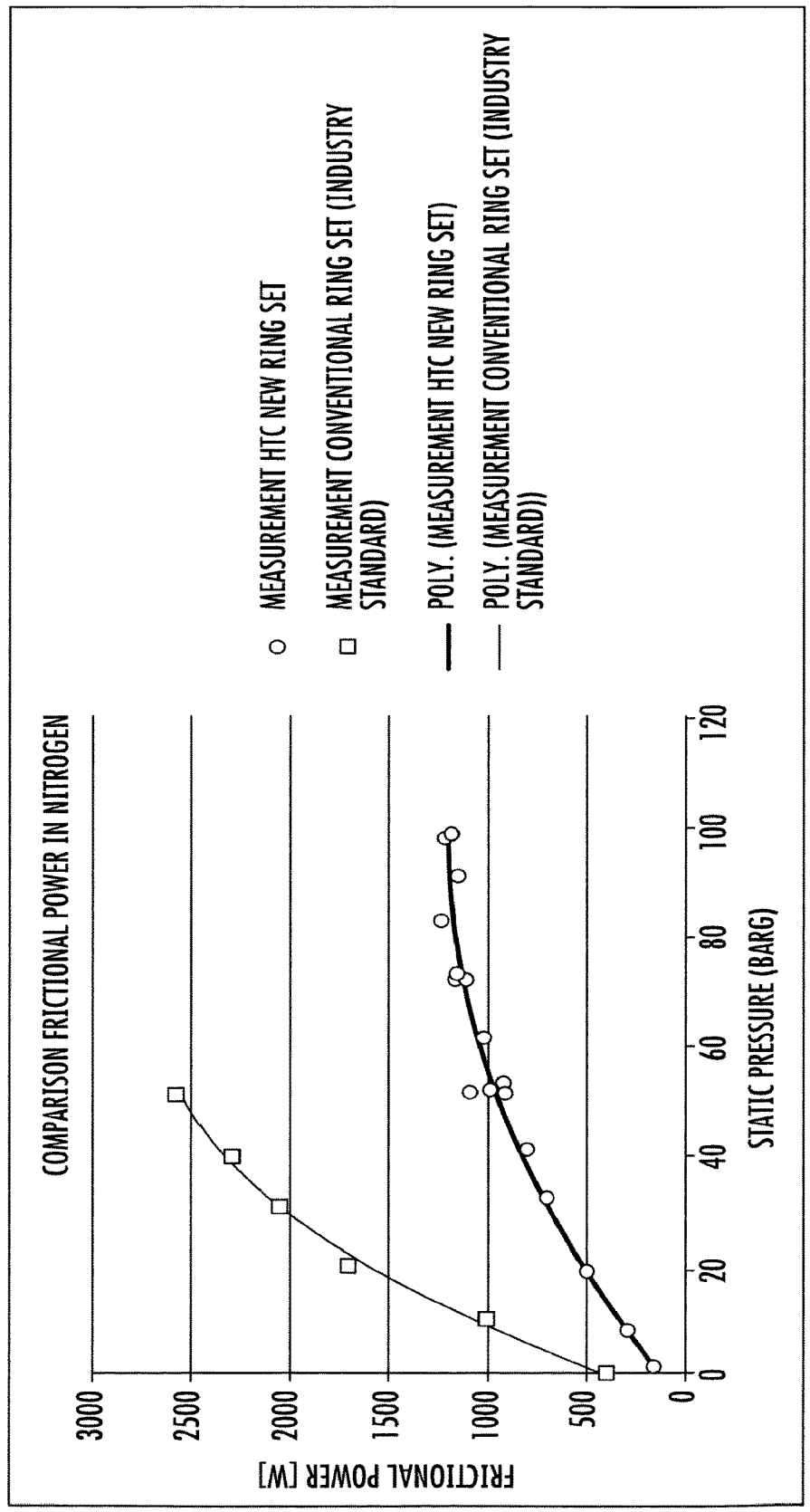
FIG. 9 is a graph illustrating performance of the disclosed seal ring assembly of FIG. 2.

FIG. 9 is a graph illustrating a comparison of frictional power, in a Nitrogen atmosphere, between a ring set including the disclose sealing ring 25 and a conventional ring set. As can be seen, frictional power associated with the conventional ring set rises to a maximum of about 2550 Watts at a static pressure of about 50 bars. With the ring set including the disclosed sealing ring 25, at a static pressure of about 50 bars the frictional power is about 1000 Watts. Frictional power for the ring set including the disclosed sealing ring 25 tops out at about 1200 Watts at a static pressure of about 100 bars. Thus, with the disclosed sealing ring 25, frictional power is substantially lower than conventional sealing arrangements. This results in substantially reduced heat generated during opertion, and substantially less wear of the sealing elements. For other non oxidizing gases the same drop in frictional power is expected.

While the present invention has been disclosed with reference to certain embodiments, numerous modifications, alterations and changes to the described embodiments are possible without departing from the spirit and scope of the invention, as defined in the appended claims. Accordingly, it is intended that the present invention not be limited to the described embodiments, but that it has the full scope defined by the language of the following claims, and equivalents thereof.

What is claimed is:

1. A sealing ring for use in a chamber of a stuffing box of a reciprocating compressor, the sealing ring comprising:
   first and second seal rings engaged along respective side surfaces;
   a cover ring disposed around the first and second seal rings such that outside diameters of the first and second seal rings engage an inside diameter of the cover ring;
   a support ring engaged with the first seal ring and the cover ring; and
   a backup ring engaged with the second seal ring and the cover ring.

2. The sealing ring of claim 1, wherein an outer surface of the first seal ring has a first width that is equal to a second width of an outer surface of the second seal ring.

3. The sealing ring of claim 2, wherein the second seal ring has a circumferential groove formed on an inner surface thereof, the groove disposed adjacent the first seal ring.

4. The sealing ring of claim 3, wherein the inner surface of the second seal ring has a third width spanning from the groove to the backup ring, the third width being less than the first width and the second width.

5. The sealing ring of claim 4, wherein the first seal ring has an opening traversing the first width of the first seal ring to provide a gas path between an outer side of the sealing ring and the groove.

6. The sealing ring of claim 5, wherein the inner surface of the second seal ring forms the effective sealing area when the groove is pressurized.

7. The sealing ring of claim 1, wherein the cover ring includes circumferential recesses configured to receive first and second spring elements configured to maintain the cover ring in engagement with the first and second seal rings.

8. The sealing ring of claim 1, wherein the first seal ring has an opening traversing a width of the first seal ring to allow the first seal ring to expand and contract, and the second seal ring has an opening traversing a width of the second seal ring to allow the second seal ring to expand and contract.

9. The sealing ring of claim 1, wherein the first and second seal rings comprise a PEEK impregnated with a nanomaterial.

10. The sealing ring of claim 1, wherein the first seal ring has a first width, the second seal ring has a second width, and the cover ring has a third width, the third width being greater than both the first width and the second width.

11. The sealing ring of claim 10, wherein the third width is less than the combination of the first width and the second width.

12. A sealing ring for use in a chamber of a stuffing box of a reciprocating compressor, the sealing ring comprising:
   first and second seal rings engaged with each other;
   a cover ring disposed around the first and second seal rings;
   a support ring engaged with the first seal ring and the cover ring; and
   a backup ring engaged with the second seal ring and the cover ring.

13. The sealing ring of claim 12, wherein the first seal ring has a width that is equal to a width of the second seal ring.

14. The sealing ring of claim 12, wherein the second seal ring has a groove formed on an inner surface thereof, the groove disposed adjacent the first seal ring.

15. The sealing ring of claim 14, wherein the first seal ring has an opening traversing a width of the first seal ring to provide a gas path between an outside surface of the sealing ring to the groove.

16. The sealing ring of claim 12, wherein the first and second seal rings have openings traversing a width of each ring to allow the first and second seal rings to expand and contract during operation.

17. The sealing ring of claim 12, wherein the cover ring includes circumferential recesses configured to receive first and second spring elements configured to maintain the cover ring in engagement with the first and second seal rings.

18. The sealing ring of claim 12, wherein the first and second seal rings comprise a PEEK impregnated with a nano-material.

19. The sealing ring of claim 12, wherein the first seal ring has a first width, the second seal ring has a second width, and the cover ring has a third width, the third width being greater than both the first width and the second width.

20. The sealing ring of claim 19, wherein the third width is less than the combination of the first width and the second width.

* * * * *